No. 865,277. PATENTED SEPT. 3, 1907.
J. D. STANNARD.
NAUTICAL INDICATING DEVICE.
APPLICATION FILED OCT. 13, 1906.

3 SHEETS—SHEET 1.

Witnesses
Louis R. Heinrichs
C. C. Hines

Inventor
Jay D. Stannard

By Victor J. Evans
Attorney

No. 865,277. PATENTED SEPT. 3, 1907.
J. D. STANNARD.
NAUTICAL INDICATING DEVICE.
APPLICATION FILED OCT. 13, 1906.

3 SHEETS—SHEET 2.

Inventor
Jay D. Stannard

Witnesses
Louis R. Heinrichs
C. C. Hines

By Victor J. Evans
Attorney

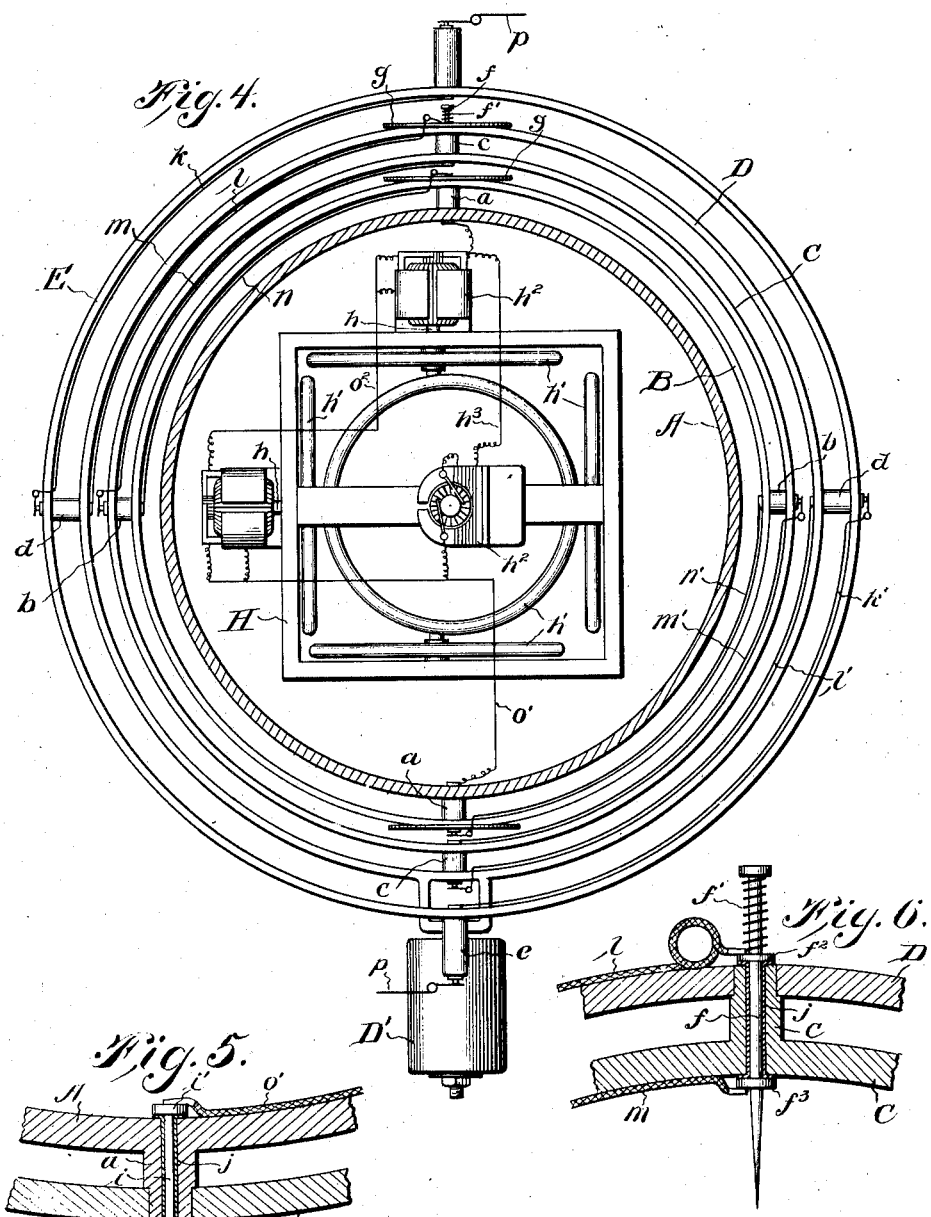

UNITED STATES PATENT OFFICE.

JAY D. STANNARD, OF PHŒNIX, ARIZONA TERRITORY.

NAUTICAL INDICATING DEVICE.

No. 865,277.    Specification of Letters Patent.    Patented Sept. 3, 1907.

Application filed October 13, 1906. Serial No. 338,813.

To all whom it may concern:

Be it known that I, JAY D. STANNARD, a citizen of the United States of America, residing at Phœnix, in the county of Maricopa and Territory of Arizona, have invented new and useful Improvements in Nautical Indicating Devices, of which the following is a specification.

This invention relates to a device by which the course of a vessel may be indicated on a globe or map and the position of the vessel at any time in its course or location on the earth's surface determined with approximate accuracy without the necessity of making the usual observations and calculations, the object of the invention being to provide a device of this character which will be sufficiently accurate for all practical purposes and of value in cloudy and stormy weather and at other times when observations cannot be made.

Figure 1:
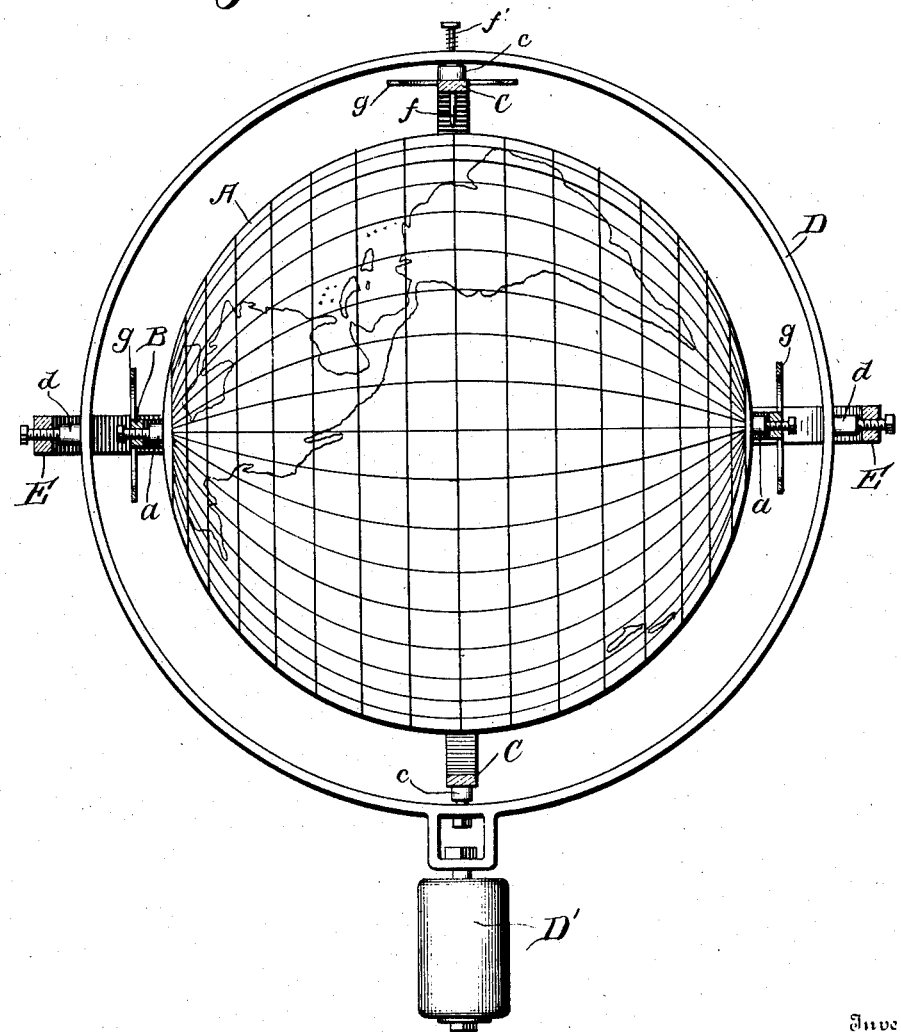
Figure 2:
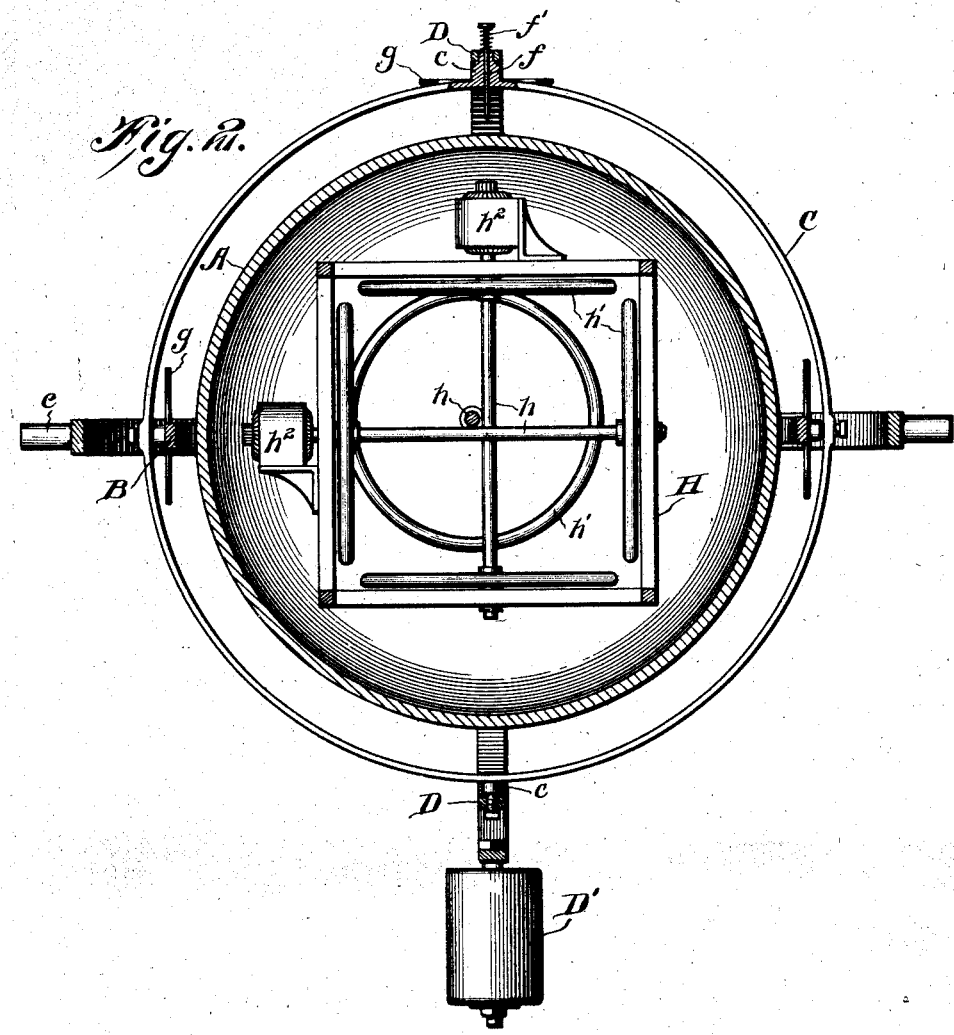
Figure 3:
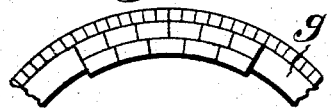

In the accompanying drawings,—Figure 1 is a view in elevation, with certain rings in central vertical section, of a nautical indicating device embodying my invention. Fig. 2 is a central vertical section of the same taken on a plane at right angles to the plane of section shown in Fig. 1. Fig. 3 is a detail of one of the angle indicators. Fig. 4 is a sectional elevation, showing the electrical connections to the gyroscope motors, the rings being represented as disposed in a common plane for better illustration of such connections. Figs. 5 and 6 are detail sections, showing the mode of extending the conductors through the trunnions.

Referring to the drawings, A designates a globe bearing a map of the earth's surface and provided at diametrically opposite points, namely, at its poles, with trunnions $a, a$, by which the globe is mounted for rotation in an inner ring B. The ring B is in turn provided with trunnions $b, b$ at right angles to axis $a, a$ mounted to rotate on an inner vertical ring C, whereby said ring B is adapted to swing on a horizontal axis. The inner vertical ring C turns on vertical bearings or trunnions $c, c$ on an outer vertical ring D, from the base of which is suspended a weight D' acting to normally maintain it in a vertical position by the action of gravity, irrespective of the motions of the vessel on which the device is used. The outer vertical ring is journaled on horizontal bearings $d, d$ carried by an outer or main horizontal ring E which forms a support for the elements thus far described. The ring E is provided at right angles to the bearings $d, d$ with trunnions $e, e$ adapted to rest in suitable bearings in a casing or support upon the ship.

An indicator $f$, comprising a plunger pin, is fitted to slide through the upper bearing $c$ and is normally held in an elevated position by a spring $f'$. This plunger is provided with a pointed lower end adapted to indicate on the surface of the globe when the plunger is depressed the point of location of the vessel thereon.

Angle indicators $g$ are disposed upon the rings adjacent the upper bearing $c$ and each of the bearings $b, b$ and $a, a$ in order that the angular relation of the rings may be determined, as hereinafter described, for indicating the course or position of the vessel.

Arranged within the globe is a preferably rectangular frame H in which are journaled a series of shafts $h$ arranged at right angles to each other, and each carrying a pair of wheels or gyroscopes $h'$. Connected with these shafts are electric motors or other driving devices $h^2$ to which the circuit wires lead from the exterior through the bearings $a, a$.

The electrical connections for driving the motors from a battery or other source of electrical current are clearly shown in Figs. 4, 5 and 6, from which it will be seen that a conducting pin $i$ extends through each of the trunnions with the exception of the upper trunnion $c$, in which slides the plunger pin $f$, which is utilized as the conductor at that point, the pins being insulated from the globe and rings by insulating sleeves $j$. The pins $i$ are similar in construction, each being held from longitudinal movement by heads $i'$, $i^2$, while the pin $f$ slides in electrical contact with conducting washers $f^2, f^3$, fixed to the ends of the coacting sleeve $j$. A set of conducting wires $k, l, m$ and $n$ connect the pin $i$ of one trunnion $e$ with the pin $i$ of one of the trunnions $a$, while a corresponding set of conductors $k', l', m'$ and $n'$ connect the pin of the other trunnion $e$ with the pin of the other trunnion $a$, said sets of wires being arranged on opposite sides of the instrument. The wires are suitably secured to the rings and terminally contact with the respective heads and washers $i'$, $i^2$, their arrangement is such as not to interfere with the free movements of the rings. The brushes of two of the motors are connected to the pins $i$ of trunnions $a$ by wires $o, o'$, and wires $o^2, o^3$, connect the brushes of the other motors therewith. Circuit wires $p$ lead to the outer ends of the pins $i$ of conductors $e$ from a battery or other source of electrical energy. (Not shown). The current from the source flows through one circuit wire $p$ to the motors through one of the sets of conducting wires and back through the other set of wires and other circuit wire $p$, as will be readily understood. A suitable switch for controlling the electric current may be provided and arranged at any suitable point between the source of current supply and indicator.

It is well known that the tendency of a rapidly revolving wheel or sphere is to maintain itself in the plane of its rotation. If no other forces are acting upon it, it will retain its position as long as the rotation is continued. The effect of the wheels or gyroscopes $h'$ revolving in planes at right angles to each other is to maintain the globe A in the position in which it is set. Hence if the axis $a, a$ of the globe is placed parallel to the earth's axis and motion communicated to the wheels or gyroscopes, the said axis $a, a$ would be maintained parallel to the earth's axis so long as the motion of the gyroscopes is maintained, irrespective of the motion of the vessel on which the indicating device is carried. As an illustration, we will suppose a vessel equipped with this device is in New York harbor. The globe and inner horizontal ring are freely movable on their axes, and hence if the globe were adjusted to the proper position relative to the pointer $f$, the axis $a, a$ would lie in the plane of the meridian passing through New York and would be elevated through an angle equal to the latitude of New York, the angle showing the latitude being observable on the coacting graduated circles $g$ at $b, b$ by means of a vernier. An angle equal to the longitude of New York would be set off on the graduated circles $g, g$ adjacent $a, a$. These settings properly made would bring the location of New York on the globe directly under the pointer $f$, which could be observed by depressing the pointer. For convenience a similar graduated circle is applied at the top of the inner vertical ring C. This circle indicates the angle between a line joining the bow and stern of the vessel and the meridian passing through the location of the vessel, or in other words would indicate the direction in which the vessel is pointing. If, when the globe has been so set and the gyroscopes are started before the ship moves, the ship may turn in any direction and go any distance, and the axis $a, a$ will constantly remain parallel to the earth's axis, while the vertical pointer $f$, influenced by gravitation, will always indicate the position of the ship on the earth through the relative motion between the pointer and globe thereby produced. A pen or pencil fixed on the end of this pointer would accordingly trace the path followed by the ship over the water in going from one port to another, provided it could work without friction on the globe.

It will, of course, be understood that due allowance may be made for incorrect readings in longitude which may ensue from the greater effect on the instrument of the rotation of the earth than from any possible eastward or westward movement of the ship.

Since the axis $d, d$ of the outer vertical circle D is fixed parallel to the center line of the ship, in alinement with the trunnions $d, d$ which extend toward the bow and stern of the ship, the angle between it and the vertical plane of the axis $a, a$, which is always in the meridian, will be the bearing of the course upon which the ship is sailing. This bearing may be conveniently read at any and all times on the graduated circle $g$ adjacent the indicator $f$.

To make the action of this device clear, suppose a vessel in its initial position be located at the equator and in longitude 60° west with her head due north. Set the graduated circles $g, g$ at $b, b$ to indicate 0° latitude and the graduated circles at $a, a$ to indicate 60° west longitude. Let the north pole of the globe be turned to the north and the globe turned until the pointer $f$ indicates the intersection of the equator with the 60th meridian. The axis of the globe will now be parallel to the earth's axis; hence the graduated circle about the pointer $f$ will indicate 0° the angle between the center line of the ship and the meridian. A vertical through $f$ would make an angle of 90° at the earth's center with the earth's axis. The same vertical would also make an angle of 90° at the center of the globe with the axis $a, a$ of the globe, since the axis of the latter has been placed parallel to the axis of the former by the settings above noted. Let the gyroscopes of the device be now started and the vessel sail due north along the meridian a distance of 10° of latitude. In the new position a vertical through $f$ makes an angle of 80° with the earth's axis, and, since the axis of the globe has been maintained in a position parallel to the axis of the earth, the vertical through $f$ must make the same angle with the axis of the globe. This is made possible by the rotation about the trunnions $b, b$. The axis $a, a$, which is at right angles to the trunnions $b, b$, has apparently raised 10° from its former position with respect to the ship. If the pointer $f$ be now depressed it would indicate the point 10° north latitude, 60° west longitude directly below it. The graduated circles $g, g$ at $b, b$ indicate 10° north latitude, and the graduated circles $g, g$ at $a, a$ would indicate 60° west longitude as at first. Let the ship now be turned due east and sail 10° north latitude. The ship's course would be shown on the graduated circle about $f$, which would read 90°, the angle between the center line of the ship and the meridian. The final position of the ship on this course would be 10° north latitude, 50° west longitude, which point would be indicated on the globe by depressing the pointer $f$. The latitude 10° north would be read on the graduated circles $g, g$ at $b, b$, and the longitude 50° west would be read on the graduated circles $g, g$ at $a, a$. The motion of the device showing the change for the last course would be a rotation of the globe about its axis $a, a$, the globe having apparently turned 10° to the west, this movement bringing the 50th meridian west longitude under the pointer without change in the latitude. If the pointer $f$ were depressed at intervals along these two courses it would indicate points along the two lines specified. The position at each depression accurately indicates the position of the ship at that instant. The earth may be regarded as having no motion and the ship as moving about on its surface in more or less regular courses.

The device herein described is capable of being placed in any position, and when so placed is there maintained by the three pairs of gyroscopes acting in three planes mutually perpendicular. Hence when the globe is placed with its axis parallel to that of the earth and turned on its axis so that any meridian, say the 50th west longitude, is parallel to the same meridian of the earth, the gyroscopes will maintain this position so there will be no motion of the globe with respect to the earth. If the earth be regarded as standing still the globe may also be regarded as standing still and the apparent movement of the pointer over the globe will actually and accurately follow the movement of the ship over the surface of the earth. Let a ship be blown from her course during a storm. The pointer will indicate at any instant the ship's location, and the necessary direction to regain the course is at once shown. The ship's head has only to be so pointed that the outer vertical circle D covers the desired point on the globe, and the ship is thus headed on the most direct course towards the point.

The device is not intended to entirely supersede the compass or obviate the necessity of making the usual observations and calculations that are now necessary to determine the location of the vessel, although the device will enable such location to be determined with a fair degree of accuracy at any time. The device is of value particularly in cloudy and stormy weather to enable the master to determine the position of the ship when observations cannot be made.

Having thus described the invention, what is claimed as new, is:—

1. A nautical indicating device comprising a globe capable of being adjusted to set its axis parallel with the earth's axis, means for retaining the globe in such position in the course of travel of the vessel, an indicator adapted to coöperate with the globe, and means whereby during the progress of the vessel the indicator will change its set position to denote the course of travel and the position of the vessel on the globe.

2. A nautical indicating device comprising a globe capable of being adjusted to set its axis parallel with the earth's axis, a gyroscope for retaining the globe in such position in the course of travel of the vessel, an indicator adapted to coöperate with the globe, means for holding the indicator in a determined position, and means whereby during the course of the vessel the relative position between the globe and indicator will vary to denote the course of travel and the position of the vessel on the globe.

3. A nautical indicating device comprising a globe capable of being adjusted to set its axis parallel with the earth's axis, rotating means within the globe for retaining the same in such position in the course of travel of the vessel, an indicator adapted to coöperate with the globe, and a support for the indicator uninfluenced by the motion of the vessel, the construction being such as to produce a relative motion between the globe and indicator, whereby the latter is adapted to denote the course of travel and the position of the vessel on the globe.

4. A nautical indicator comprising a globe, a support on which the globe is revoluble in one direction, said support being adjustable at an angle to the globe, whereby the latter may be adjusted to set its axis parallel with the earth's axis, an indicator, a support for the indicator normally maintained in a vertical position, said support being movable at an angle to the direction of movement of the globe and its support, a main support for pivotally mounting the device upon the vessel to adapt it to be uninfluenced by the motion thereof, the construction being such that a relative motion between the globe and indicator will be produced during the course of travel of the vessel, whereby the indicator will act to indicate the position of the vessel on the globe, and means for determining through the angular relation of the parts the bearing of the vessel.

5. A nautical indicating device comprising a globe, means for rendering the globe capable of adjustment to set its axis parallel with the earth's axis, means for retaining the globe in such position in the course of travel of the vessel, and gravity-controlled means movable relatively to the globe during the travel of the vessel for indicating the position of the latter on the globe.

In testimony whereof, I affix my signature in presence of two witnesses.

JAY D. STANNARD.

Witnesses:
S. B. TAGGART,
L. W. COGGINS.